Figure 1:
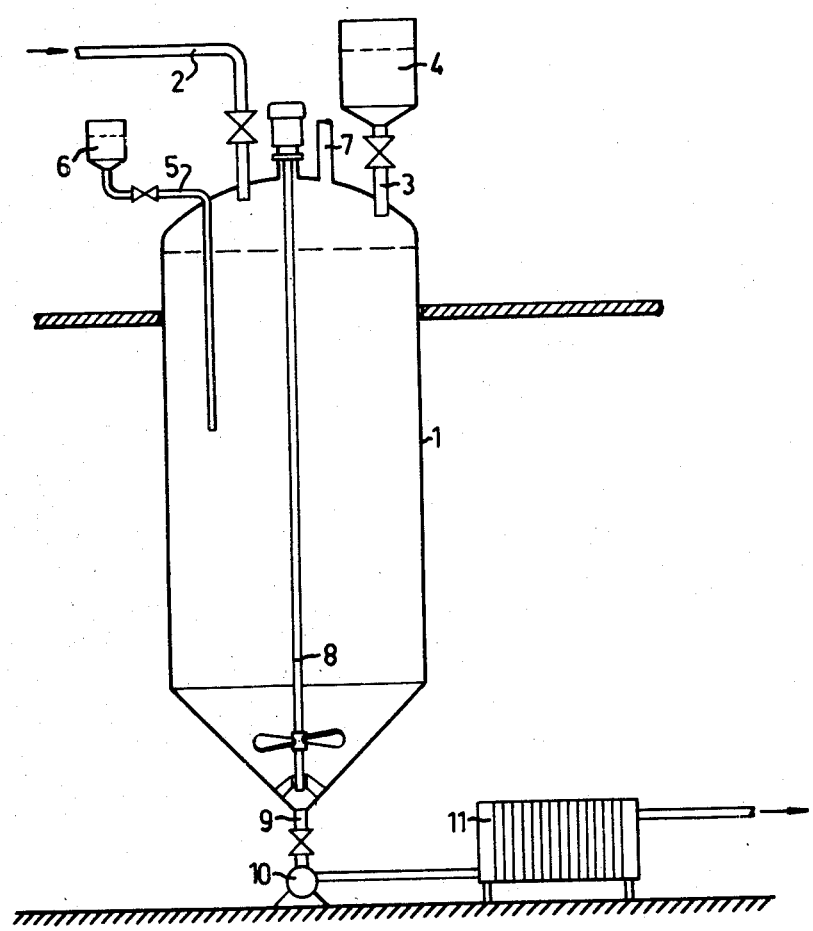

Sept. 1, 1964  L. O. BERGMAN  3,147,291
METHOD FOR PURIFYING FAT
Filed Dec. 12, 1960  3 Sheets-Sheet 3

INVENTOR
LARS OLOF BERGMAN
By Wenderoth, Lind & Ponack
Attorneys 3,147,291
METHOD FOR PURIFYING FAT
Lars Olof Bergman, Malmo, Sweden, assignor to Aktiebolaget Pellerins Margarinfabrik, Goteborg, Sweden, a corporation of Sweden
Filed Dec. 12, 1960, Ser. No. 75,412
8 Claims. (Cl. 260—424)

This invention relates to a method of further purifying fat subsequently to wet refining thereof by means of alkali.

This application is a continuation-in-part of my application Serial No. 841,057, filed September 21, 1959, now abandoned.

Most fats, including fatty oils, that are used industrially for the manufacture of foodstuffs, such as margarine, contain a greater or smaller amount of free fatty acids when in the state in which they have been obtained for instance by extraction or expression from the vegetable or animal raw material and are offered to the foodstuff industry for processing. These free fatty acids have to be removed, and for their removal the fat is subjected to a process which is called wet refining by means of alkali and comprises neutralizing the fat by treating it, usually at elevated temperature, with an aqueous solution of caustic soda or other alkali, i.e. with lye, to convert the free fatty acids in the fat into soaps, and centrifugally or gravitationally separating the fat from the more or less spent lye and the soaps formed. Most lye-refining methods hitherto known and applied include washing of the fat with warm washing water for a more complete separation of the more or less spent lye and the formed soaps from the fat. After this separation of the more or less spent lye and the soaps formed the fat still contains small lye and soap rests which must be removed as far as possible. Already a few thousands of a percent of soap rests in the fat may suffice to give the fat a disagreeable taste, and this shows the importance of a far-reaching removal of the soap rests. The procedure hitherto most often resorted to for the removal of lye and soap rests from alkali-refined fat is, in addition to washing of the fat with warm water, the conventional bleaching of the fat with an adsorbing bleaching agent, usually activated bleaching earth, by using the bleaching agent in a quantity sufficient to adsorb not only coloring matters in the fat but also alkali and soap rests in the fat to a satisfactory degree. It has, however, also been suggested (see for instance the U.S. Patent No. 2,824,885 of February 25, 1958) in connection with wet refining of fat by means of alkali to contact with the fat for the removal of small lye and soap rests therein a small amount of a non-toxic acid, for instance citric acid, that is insoluble in fat, though soluble in water, and splits up the soap rests in the fat into free fatty acids and alkali and with this alkali as well as with the alkali in lye rests in the fat forms a salt which, though soluble in water, is insoluble in the fat. According to this earlier proposal the formed alkali salt of the added fat-insoluble acid is caused to dissolve in water used for washing the alkali-refined fat, so that the salt accompanies the washing water and together therewith is removed from the fat.

Also in the method of the present invention fat wet refined by means of alkali and still containing small rests of alkali and soaps is treated for the removal of these rests with a small amount of a fat-insoluble, non-toxic acid, preferably citric acid, which splits up the soap rests into free fatty acids and alkali and with this alkali as well as with the alkali rests in the fat forms a water-soluble but fat-insoluble salt. According to the invention, however, the resulting alkali salt of the acid added to and contacted with the fat is removed from the fat not in aqueous solution but in a dry state, in that the method of the invention is characterized principally by subjecting the fat while contacting therewith the small amount of the fat-insoluble acid to vacuum drying to render the fat practically free from water so as to cause the forming fat-insoluble alkali salt of the acid to precipitate in solid form in the fat, and then separating the formed alkali salt of the acid from the fat in the dried state thereof, preferably by filtration.

This method for removing small lye and soap rests from alkali-refined fat has proved to be highly effective and, furthermore, to be advantageous for economical reasons. One important advantage is that the need of costly washing of the fat with warm water is lessened, sometimes to such a degree that such washing can be completely dispensed with, whereby also the loss of neutral fat with washing water is diminished or completely avoided. This applies especially when the fat is wet refined with alkali by a new process in accordance with which the fat is bubbled up through a column of the lye while suppressing turbulence in the lye column under the action of the bubbling up of the fat therethrough, so that the fat in the form of substantially equal interspaced drops travels substantially straight up through the lye column and on top thereof forms a homogenous layer containing only very small amounts of water, alkali and soaps. The considerable saving of costs obtained by the lessened or eliminated need for washing of the lye-treated fat with water in practice is not affected by the vacuum drying of the fat and the subsequent filtration thereof required by the invention, in that this filtration can be identical with the one to which the fat anyhow should be subjected after it has been alkali-refined or after it has been bleached, and in that the vacuum drying required by the invention can be identical with the one to which the fat anyhow should be subjected to render it practically waterfree before passing it to deodorization.

A far-reaching removal of alkali and soap rests from the alkali-refined fat before or simultaneously with a conventional bleaching, if any, of the fat with bleaching earth or other adsorbing bleaching agent reduces the required amount of the bleaching agent and thus also the loss of fat with the spent bleaching agent. As an example, the amount of a given bleaching agent required for obtaining the same decolorizing effect in bleaching an alkali-refined rape oil in one instance was 1.5 percent by weight of the fat, but diminished to 0.75 percent by weight of the fat when this in accordance with the method of the invention was treated in vacuum with an amount of citric acid of less than 0.05 percent by weight of the fat and then filtered in its vacuum-dried state. In one instance of alkali-refining coconut oil there was required for a satisfactory bleaching of the alkali-refined oil with bleaching earth a quantity thereof amounting to 0.4 percent by weight of the oil, whereas no bleaching at all was necessary when the alkali-refined oil was treated in accordance with the method of the invention in vacuum with a quantity of citric acid less than 0.05 percent by weight of the fat and then filtered in its vacuum-dried state.

The amount of free fatty acids that are formed by the splitting of the small soap rests in the alkali-refined fat by the treatment thereof with the small amount of the fat-insoluble acid is too small to be of any account, and besides it is eliminated more or less completely by the deodorizing operation finishing the purification of the fat to make it ready for use as an edible or for the manufacture of edible products, for instance margarine.

As is apparent from the foregoing, the acid which is added to and contacted with the fat must be such a fat-insoluble acid as has a higher dissociation constant than the fatty acids of the soap rest in the fat and with the alkali in the fat forms a salt that is insoluble in the fat, through soluble in water. Some examples of acids useful for the purpose of the invention are hydrochloric acid, lactic acid, tartaric acid, acetic acid, citric acid. The latter is preferable from both technical and economical viewpoints. The amount in which it need be added to and contacted with the fat has been found as a rule to vary between 0.015 and 0.05 percent by weight of the fat, depending on the kind and quality of the fat and the manner in which the fat was alkali-refined.

The treatment of the alkali-refined fat in vacuum with citric acid (or other serviceable acid) is preferably carried out at a temperature in the range of 80–95° C. and can preferably be combined with a treatment of the fat with a reducing agent for eliminating oxidation products in the fat or lowering the oxidation degree thereof. A reducing agent found especially suitable for this purpose is sodium hydrogen sulfite ($NaHSO_3$). It is added to and contacted with the fat in the presence of the added citric acid (or other serviceable acid) prior to the filtering of the fat to remove precipitates and any spent bleaching earth. The added sodium hydrogen sulfite reacts with the added acid, forming sulphur dioxide ($SO_2$) which when thus being formed in contact with the fat has a strongly reducing effect on oxidation products in the fat. The amount in which the reducing agent is added is suited to the oxidation degree of the fat. Experience appears to indicate that when using sodium hydrogen sulfite the suitable amount thereof varies between 0.01 and 0.03 percent by weight of the fat. Another reducing agent that has been found serviceable in connection with the method of the invention is gaseous hydrogen which can be bubbled up through the fat in the reaction zone in which the fat is treated in vacuum with citric acid and possibly also with bleaching earth. The temperature (preferably 80–95° C.) at which this treatment is carried out, is much too low for the gaseous hydrogen to act hardening on the fat. By carrying out the process in vacuum, that is in absence of air or other oxidizing atmosphere, the fat is effectively protected against formation of oxidation products therein.

For further elucidation of the invention reference is made below to the accompanying drawings illustrating, by way of example, in FIG. 1 a plant for batch handling and in FIG. 2 and FIG. 3 two somewhat different plants for continuous handling of the fat in accordance with the method of the invention.

In FIG. 1, reference numeral 1 denotes a tank for batch bleaching of alkali-refined fat. The tank 1 has an intake 2 for the fat, an intake 3 for bleaching agent from a container 4, a supply conduit 5 for citric acid solution from a container 6, a connection 7 to a vacuum pump for holding the tank evacuated to an absolute pressure of only a few, say six, mm. Hg, agitating means 8 and a bottom outlet 9 to a pump 10. By the pump 10 each batch of fat that has been vacuum-dried and treated under agitation with added citric acid and added bleaching earth is pumped to and through a filter 11 in which the fat is filtered with the aid of a filter aid, for instance pure kieselguhr, which initially may have been added to fat in the tank 1 and therefrom deposited on the filter disks in the filter 11. The filtered fat may be passed from the filter 11 directly to deodorization. The tank 1 can be provided with means for bubbling up gaseous hydrogen through the batch of the fat under treatment. The tank 1 can also have a separate intake for a reducing agent such as sodium hydrogen sulfite which may, however, also be added in mixture with the bleaching earth.

Figure 2:
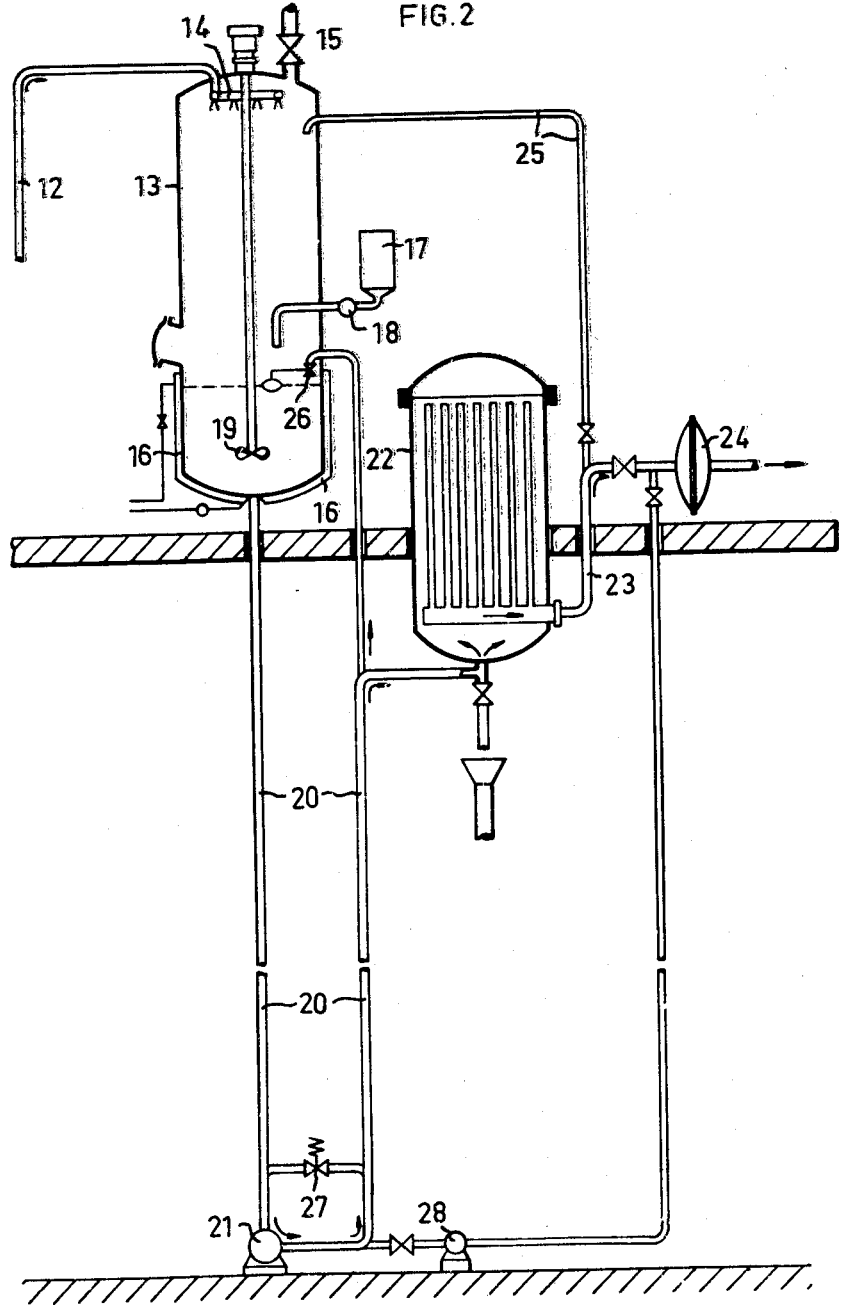

In the plant shown in FIG. 2 the fat is passed directly from a continuous wet refining process through a pipe 12 with the exclusion of air into a reaction vessel 13 at the top thereof through a spraying device 14. The container 13 is held evacuated (preferably to an absolute pressure of about 6 mm. Hg) through an evacuating pipe 15 connected to a vacuum pump. The vessel 13 is steam jacketed as shown at 16 for heating the fat while drying it by evaporation and exhausting of any water therein and while contacting with the fat in the reaction vessel 13 a small quantity of citric acid being supplied in the form of an aqueous solution from a container 17 through a dosage pump 18. The vessel 13 also serves as a mixing vessel for the admixing of a filter aid (pure kieselguhr, for example) and is equipped with agitating means 19. The fat is pumped from the vessel 13 through a pipe 20 by means of a pump 21 to a filter 22 which may be of a standard type (say Niagara Filters Europe) for filtering fat by the aid of a filter aid. From the filter 22 the filtered fat is passed through a pipe 23 and a safety and rest filter 24 to a storage tank or directly to deodorization. However, until the filter aid mixed with fat in the vessel 13 at start of work has been deposited onto the filter disks in the filter 22 and a clear filtrate has been obtained therethrough, the fat is pumped by means of the pump 21 through a return pipe 25 back to the vessel 13 in which the fat level is held constant by means of a float valve 26 connected to the pressure side of the pump 21. This pump is of overcapacity, and a relief valve 27 connected between the pressure and suction sides of the pump 21 provides for the desirable limitation of the pressure on the fat to the filter 22. For emptying the vessel 13 and the filter 22 of fat on interruption of the work, the fat rest in the vessel 13 is pumped round through the filter 22 by means of a small pump 28 until filtered clear and is then driven out through the rest and safety filter 24.

Figure 3:
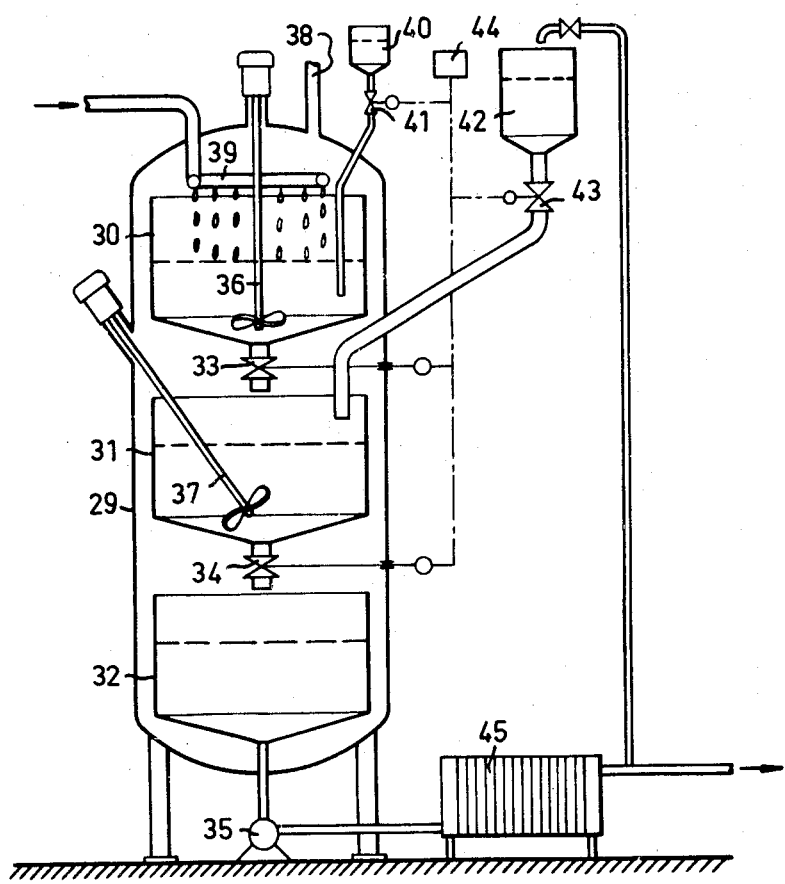

The plant shown in FIG. 3 comprises a container 29 accommodating three vertically spaced apart trays 30, 31, 32. The uppermost tray 30 has a bottom outlet 33 to the intermediate tray 31 which has a bottom outlet 34 to the lowermost tray 32 which has a bottom outlet to a pump 35. In the two upper trays 30, 31 there are provided agitating means 36 and 37, respectively. The container 29 has a connection 38 to a vacuum pump. From a plant for continuous wet refining of fat by means of alkali the refined fat from which the more or less spent lye and soaps dissolved therein have been separated, with the exception of small rests, is passed to the uppermost tray 30 through a spraying device 39 for thoroughly deaerating and drying the fat under the action of the vacuum that is maintained in the container 29. In the tray 30 a small quantity of a citric acid solution is added to the fat from a container 40 through a dosage valve 41. A bleaching agent (in powder form or in the form of a suspension in oil) is added to the fat in the tray 31 from a container 42 through a dosage valve 43. The fat is discharged from the trays 30 and 31 through their bottom outlets 33 and 34 intermittently through valves disposed in these outlets and under the control of an automatic program apparatus 44 in a system that is common to said bottom outlet valve and the dosage valves 41 and 43 and automatizes the operation of the plant. This system can be constructed in accordance with well known principles, and therefore it is indicated only very schematically on the drawing. The tray 32 serves as a buffer between the intermittent fat discharge thereto and the continuous pumping of the fat therefrom by the pump 35 to and through a filter 45 filtering off the spent bleaching agent and other solids, including precipitated alkali citrate. From the filter 45 the filtered fat can be passed directly to deodorization. The time during which the fat should be held in the tray 32, where the bleaching takes place, may preferably amount to about 15 minutes.

What I claim and desire to secure by Letters Patent is:

1. Method for purifying crude fatty oils and fats, containing fatty acid impurities, which comprises
   (1) intimately contacting said crude fat with aqueous alkali solution to substantially completely convert fatty acid impurities to soapstock which dissolves in resultant aqueous phase, whereby the crude fat is neutralized,
   (2) separating the resultant neutralized crude fat layer from the resultant aqueous layer, said crude fat layer containing minor quantities of soapstock and alkali in admixture therewith,
   (3) acid-treating the crude fat layer with acid which is fat insoluble and has a higher dissociation constant than the fatty acids of the soap residue, forming a fat insoluble-water soluble alkali salt, to thereby split off the fatty acids of the residual soapstock, whereby the resultant split-off fatty acids dissolve in the crude fat and alkali is converted to salt,
   (4) vacuum-drying the crude fat to eliminate substantially all water therefrom, whereby said alkali salt is precipitated in said crude fat, and
   (5) filtering the resultant crude fat-alkali salt admixture to remove substantially all alkali salt, whereby a substantially alkali-salt-free oil product is obtained.

2. Method for purifying crude fatty oils and fats, containing fatty acid impurities, which comprises
   (1) intimately contacting said crude fat with aqueous alkali solution to substantially completely convert fatty acid impurities to soapstock which dissolves in resultant aqueous phase, whereby the crude fat is neutralized.
   (2) separating the resultant neutralized crude fat layer from the resultant aqueous layer by centrifugal separation, said crude fat layer containing minor quantites of soapstock and alkali in admixture therewith,
   (3) acid-treating the crude fat layer with acid which is fat insoluble and has a higher dissociation constant than the fatty acids of the soap residue, forming a fat insoluble-water soluble alkali salt, to thereby split off the fatty acids of the residual soapstock, whereby the resultant split-off fatty acids dissolve in the crude fat and alkali is converted to salt,
   (4) vacuum-drying the crude fat to eliminate substantially all water therefrom, whereby said alkali salt is precipitated in said crude fat, and
   (5) filtering the resultant crude fat-alkali salt admixture to remove substantially all alkali salt, whereby a substantially alkali-salt-free oil product is obtained.

3. Method for purifying crude fatty oils and fats, containing fatty acid impurities, which comprises
   (1) intimately contacting said crude fat with aqueous alkali solution to substantially completely convert fatty acid impurities to soapstock which dissolves in resultant aqueous phase, whereby the crude fat is neutralized,
   (2) separating the resultant neutralized crude fat layer from the resultant aqueous layer by gravitational separation, said crude fat layer containing minor quantities of soapstock and alkali in admixture therewith,
   (3) acid-treating the crude fat layer with acid which is fat insoluble and has a higher dissociation constant than the fatty acids of the soap residue, forming a fat insoluble-water soluble alkali salt, to thereby split off the fatty acids of the residual soapstock, whereby the resultant split-off fatty acids dissolve in the crude fat and alkali is converted to salt,
   (4) vacuum-drying the crude fat to eliminate substantially all water therefrom, whereby said alkali salt is precipitated in said crude fat, and
   (5) filtering the resultant crude fat-alkali salt admixture to remove substantially all alkali salt, whereby a substantially alkali-salt-free oil product is obtained.

4. Method for purifying crude fatty oils and fats, containing fatty acid impurities, which comprises
   (1) intimately contacting said crude fat with aqueous alkali solution to substantially completely convert fatty acid impurities to soapstock which dissolves in resultant aqueous phase, whereby the crude fat is neutralized,
   (2) separating the resultant neutralized crude fat layer from the resultant aqueous layer, said crude fat layer containing minor quantities of soapstock and alkali in admixture therewith,
   (3) acid-treating the crude fat layer with an aqueous solution of an acid selected from the group consisting of hydrochloric, lactic, tartaric, acetic and citric, said acid added in sufficient amount to split off the fatty acids of the residual soapstock, whereby the resultant split-off fatty acids dissolve in the crude fat and alkali is converted to salt of said acid,
   (4) vacuum-drying the crude fat to eliminate substantially all water therefrom, whereby said alkali salt is precipitated in said crude fat, and
   (5) filtering the resultant crude fat-alkali salt admixture to remove substantially all alkali salt, whereby a substantially alkali-salt-free oil product is obtained.

5. Method for purifying crude fatty oils and fats, containing fatty acid impurities, which comprises
   (1) intimately contacting said crude fat with aqueous alkali solution to substantially completely convert fatty acid impurities to soapstock which dissolves in resultant aqueous phase, whereby the crude fat is neutralized,
   (2) separating the resultant neutralized crude fat layer from the resultant aqueous layer by centrifugal separation, said crude fat layer containing minor quantities of soapstock and alkali in admixture therewith,
   (3) acid-treating the crude fat layer with aqueous citric acid solution in sufficient amount to split off the fatty acids of the residual soapstock, whereby the resultant split-off fatty acids dissolve in crude fat and alkali citrate is formed,
   (4) vacuum-drying the crude fat to eliminate substantially all water therefrom, whereby alkali citrate is precipitated in said crude fat, and
   (5) filtering the resultant crude fat-alkali citrate admixture to remove substantially all alkali citrate, whereby a substantially alkali citrate-free oil product is obtained.

6. Method of claim 5 wherein crude fat is continuously passed through a contact zone in which citric acid is continuously added in amount up to about 0.05% by weight of said fat, wherein said vacuum-drying is effected, concomitantly with stirring of said fat, at a temperature of about 80 to 95° C. and wherein said filtering is effected by continuously passing the resultant dried crude oil through filter means.

7. Method for purifying crude fatty oils and fats, containing fatty acid impurities, which comprises
   (1) intimately contacting said crude fat with aqueous alkali solution to substantially completely convert fatty acid impurities to soapstock which dissolves in resultant aqueous phase, whereby the crude fat is neutralized,
   (2) separating the resultant neutralized crude fat layer from the resultant aqueous layer by gravitational separation, said crude fat layer containing minor quantities of soapstock and alkali in admixture therewith, (3) acid-treating the crude fat layer with aqueous citric acid solution in sufficient amount to split off the fatty acids of the residual soapstock, whereby the resultant split-off fatty acids dissolve in crude fat and alkali citrate is formed, (4) vacuum-drying the crude fat to eliminate substantially all water therefrom, whereby alkali citrate is precipitated in said crude fat, and (5) filtering the resultant crude fat-alkali citrate admixture to remove substantially all alkali citrate, whereby a substantially alkali citrate-free oil product is obtained.

8. Method of claim 7 wherein crude fat is continuously passed through a contact zone in which citric acid is continuously added in amount up to about 0.05% by weight of said fat, wherein said vacuum-drying is effected, concomitantly with stirring of said fat, at a temperature of about 80 to 95° C. and wherein said filtering is effected by continuously passing the resultant dried crude oil through filter means.

References Cited in the file of this patent

UNITED STATES PATENTS

| | | |
|---|---|---|
| 1,808,844 | Frick | June 9, 1931 |
| 2,483,414 | Henderson et al. | Oct. 4, 1949 |
| 2,510,379 | Christenson | June 6, 1950 |
| 2,678,326 | Ziels | May 11, 1954 |
| 2,732,388 | Sadler | Jan. 24, 1956 |